(12) United States Patent
Oldermann et al.

(10) Patent No.: US 6,396,797 B1
(45) Date of Patent: May 28, 2002

(54) RECORDING OR REPRODUCING UNIT WITH MEANS FOR COMPENSATING THE UNBALANCE OF PLATE-SHAPED INFORMATION MEDIA

(75) Inventors: Klaus Oldermann, Villingen-Schwenningen; Dietmar Uhde, Königsfeld, both of (DE)

(73) Assignee: Deutsche Thomson-Brandt GmbH, Villingen-Schwenningen (DE)

( * ) Notice: Subject to any disclaimer, the term of this patent is extended or adjusted under 35 U.S.C. 154(b) by 0 days.

(21) Appl. No.: 09/448,848

(22) Filed: Nov. 23, 1999

(30) Foreign Application Priority Data

Nov. 30, 1998 (DE) .......................... 198 55 228

(51) Int. Cl.$^7$ .............................................. G11B 23/00
(52) U.S. Cl. ........................................................ 369/270
(58) Field of Search .............................. 369/270, 75.1, 369/75.2, 271

(56) References Cited

FOREIGN PATENT DOCUMENTS

| EP | 0829872 A2 | 3/1998 |
|----|------------|--------|
| EP | 0836185 A2 | 4/1998 |
| WO | WO98/03974 | 1/1998 |

OTHER PUBLICATIONS

German Search Report citing the above–listed references: AM, AN, and AO.

*Primary Examiner*—Allen Cao
(74) *Attorney, Agent, or Firm*—Joseph S. Tripoli; Frederick A. Wein

(57) ABSTRACT

Recording or reproducing unit for a plate-shaped information medium including an improved autobalancer for compensating an unbalance. The autobalancer for compensating an unbalance is arranged in the hold-down for a plate-shaped information medium at a diameter greater than an inside scanning diameter, required for scanning, of the information medium and is formed by at least one disc in a circularly running groove forming the means for compensating an unbalance.

11 Claims, 2 Drawing Sheets

RECORDING OR REPRODUCING UNIT WITH MEANS FOR COMPENSATING THE UNBALANCE OF PLATE-SHAPED INFORMATION MEDIA

FIELD OF THE INVENTION

The invention relates to a recording or reproducing unit with means for compensating the unbalance of plate-shaped information media, a so-called autobalancer being provided neither in the disc turntable nor in the drive motor.

BACKGROUND OF THE INVENTION

Devices denoted as so-called autobalancers for the purpose of automatically compensating an unbalance, which proceeds from the information medium, for example from the CD, the disc turntable and, as the case may be, from the drive motor, are generally known. Such autobalancers became necessary with the continuously rising rate of rotation in CD ROM drives, in order to be able at higher speed to read from and/or write to the information media originally provided for lower speeds. The reason for the increase in the rate of rotation is to be seen, in particular, in the reduction in the access time and in the increase in the data rate provided. With the rise in the rate of rotation, which is already a high multiple of the simple scanning speed, it has become necessary, for the purpose of reliably guiding the scanning beam on the information track, to counteract the centrifugal forces and/or vibrations produced by eccentricity and irregular mass distribution. An autobalancer provided in the disc turntable for the information medium comprises a circularly running groove in which there are provided for the purpose of unbalance compensation a plurality of balls which rotate with the disc turntable and are mutually aligned in the circularly running groove in a fashion counteracting the unbalance in the event of the occurrence of an eccentricity.

Since, as a rule, the disc turntable forms a structural unit with the drive motor, it is, for example, not possible to combine a cost-effective drive motor of another supplier with an autobalancer. Known autobalancers are arranged on the scanning side of the information medium in the disc turntable or in the drive motor. Consequently, the outside diameter possible for an autobalancer is limited by the inside scanning diameter of the information medium. In order to compensate a prescribed unbalance, an overall height is therefore required which is determined by the diameter of the balls to be used in the autobalancer. Moreover, the response of the autobalancer is to be improved in order already to ensure the effectiveness of the information medium when it has a slight unbalance, and to reduce vibrations of the information medium which are required for the functioning of the autobalancer.

SUMMARY OF THE INVENTION

It is the object of the invention basically to reduce the overall height required for the autobalancer, to improve its response and to create an autobalancer which is very largely independent of the drive motor and disc turntable for the information medium.

This object is achieved with means specified in independent claims, and advantageous refinements and developments are specified in dependent claims.

One aspect of the invention is, despite the limited possibilities for configuring known autobalancers, to find a solution corresponding to the requirements mentioned in the object.

The invention is based on the principle of configuring the autobalancer to be independent of the scanning and drive sides of the information medium by virtue of the fact that it is arranged not on the scanning side of the information medium, but in the hold-down which retains the information medium on the disc turntable.

Since a groove in which the balls of the autobalancer are aligned relative to one another is to be arranged as centrally as possible relative to the driving axis, it was firstly to be assumed that it would not be possible to achieve comparable results with an autobalancer provided in the hold-down. Surprisingly, it has emerged that the advantages which result from the arrangement of the autobalancer in the hold-down outweigh the disadvantages of an enlarged tolerance chain between autobalancer and drive axis. The principle of an autobalancer consists in that an unbalance with a phase shift of 180 degrees between the vibration emanating from the unbalance of a system and the vibration of the balancer is compensated. The compliant support of the vibrating configuration is therefore of great importance. Arranging the autobalancer in the hold-down increases the distance from the clamping point of the vibrating system, with the result that the information medium experiences a lesser deflection in conjunction with a comparable deflection of the autobalancer. On the other hand, this also means that an amplitude of the vibrations which is required for the mode of operation of the autobalancer is reached comparatively earlier with reference to the autobalancer and with lesser vibration of the information medium. This means that arranging the autobalancer in the hold-down improves the response of the autobalancer, and that automatic compensation is already achieved with a lesser unbalance of the information medium.

Further advantages of the arrangement of an autobalancer in the hold-down consist in that its diameter is no longer limited by the inside scanning diameter of the information medium. For the purpose of reducing the height required for the autobalancer, an autobalancer is proposed which has in the groove of the autobalancer discs which fulfil a function comparable to the known balls. The weight of the compensating means can be reduced owing to the larger diameter of the circularly running groove, in which the means for compensating the unbalance are arranged. Given a larger diameter of the circle formed by the groove, it is therefore advantageously possible to use smaller balls or discs to compensate an unbalance, and to reach a nominal speed more quickly with a lesser mass. The use of a disc as means for compensating the unbalance in an autobalancer is advantageous, since both a lesser overall height and a lesser degree of running noise are achieved. By comparison with discs, balls cause greater running noise, since they run around several times and strike one another in the groove, as a rule, during acceleration and braking. Because of the greater friction, discs come to a standstill comparatively earlier. The disadvantage that discs rotate less because of the higher friction, and therefore initially appear less suitable as compensating means than balls is eliminated by using discs which have a projection with a lesser diameter. The bearing and/or friction surface is thereby reduced. According to one design, a disc provided as means for compensating unbalance is configured in such a way that it consists of two materials, the material in the inner region, which forms the projection, preferably being a plastic having good surface slip, and the material in the outer region being a heavy material, such as steel, lead or brass, for example. In order to ensure an adequate bearing surface, a ratio of inside to outside diameter in the range from 30 to 50% is provided.

The lateral projection in the inner region of the disc is selected to be in the range from half a tenth to five tenths of a millimetre, and approximately two millimetres are provided as the thickness of the disc. However, in principle the disc can also be designed in one piece and symmetrically.

The autobalancer provided in the hold-down is very largely independent of the drive motor and disc turntable for the information medium, with the result that it is advantageously possible to combine different drive systems corresponding to the requirements with the automatic compensating device for rotating information media.

BRIEF DESCRIPTION OF THE DRAWINGS

The invention is explained in more detail below with the aid of drawings, in which.

DETAILED DESCRIPTION OF THE PREFERRED EMBODIMENTS

Figure 2:
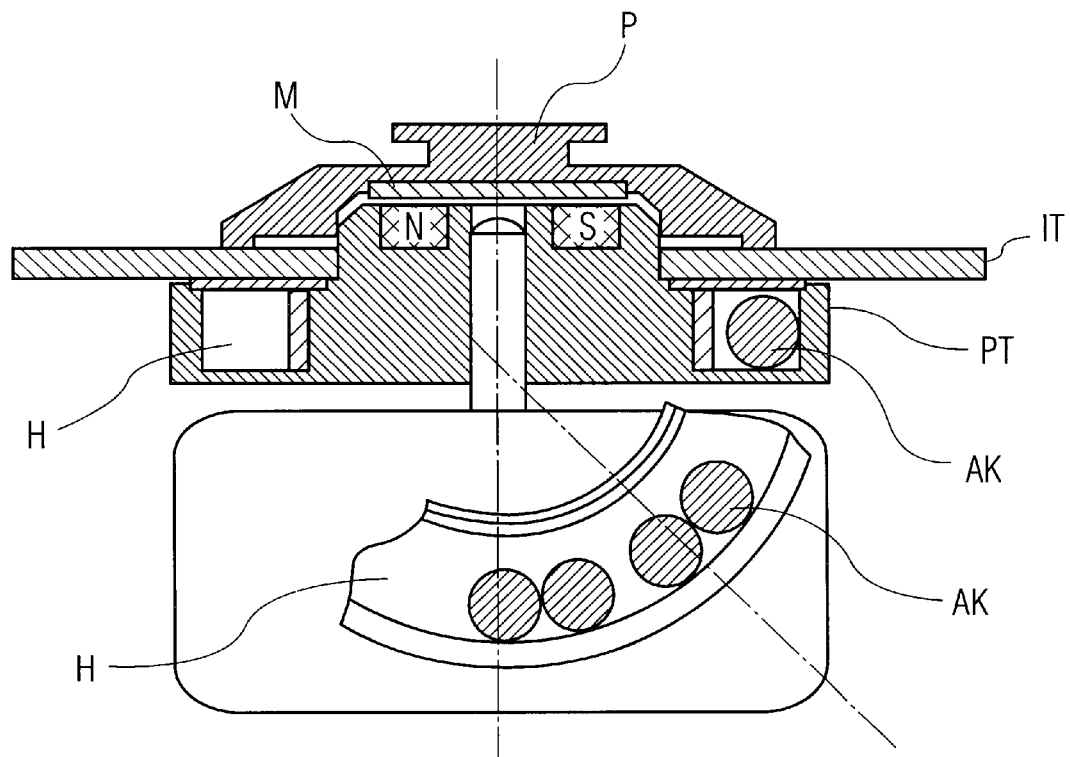
FIG. 2 shows a sketch of the principle of a section through a known means for compensating unbalance, with autobalancer in the disc turntable.

In accordance with FIG. 2, a known recording or reproducing unit with means for compensating the unbalance of plate-shaped information media IT has a disc turntable PT with autobalancer. The information medium IT centred on the dome of the disc turntable PT is clamped with a hold-down P, also denoted as puck, between the hold-down P and disc turntable PT. Provided for this purpose in the dome of the disc turntable PT are magnets N,S which attract a metal plate M provided in the hold-down P and thereby exert a clamping force on the information medium IT on the disc turntable PT. The autobalancer is formed by a circularly running groove H in which there are arranged compensating balls AK which determine, in particular, the overall height of the disc turntable PT. Since, starting from a prescribed diameter, the information medium IT is to be scanned on the drive side of the disc turntable PT, a possible diameter of the disc turntable PT for the disc turntable PT and the autobalancer is limited by the inside scanning diameter of the information medium IT. However, since, for example, an unbalance of up to one gram times centimetre is permissible for a CD produced in accordance with the standard, the autobalancer must be capable of compensating at least one such unbalance. The outside diameter for the autobalancer is limited, thus necessarily yielding therefrom an overall height which cannot be reduced.

Furthermore, the aim is to ensure a deflection and/or a vibration of the autobalancer with an amplitude which permits the compensating balls AK provided in the groove H to be aligned for the purpose of compensating an unbalance. The required deflection is greater the closer the compensating balls AK are arranged to the axis of rotation, or the lesser the diameter of the circle which is formed by the groove H.

With regard to a vibrating system, the known autobalancer forms with the disc turntable PT and with the drive motor a structural unit which opposes exchangeability of individual components such as, for example, the use of another drive motor.

Figure 1:
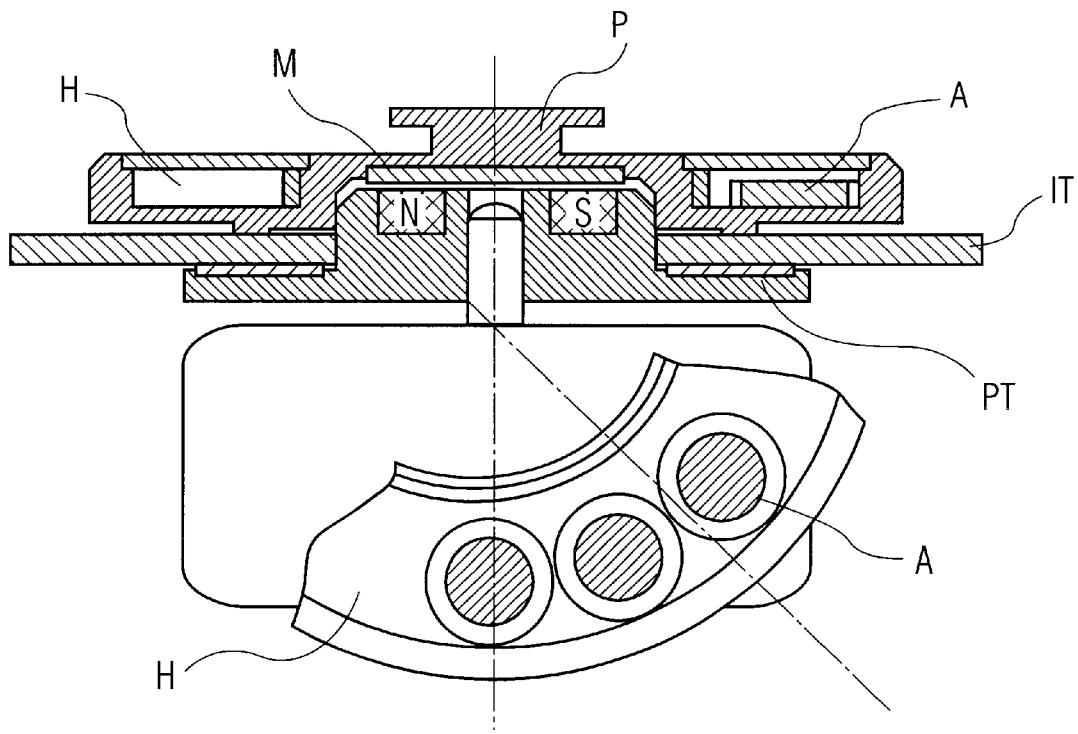
FIG. 1 shows a sketch of the principle of a section through a disc turntable with information medium and autobalancer in the hold-down, for the purpose of compensating unbalance.

In order to avoid the disadvantages of the known autobalancer in the disc turntable PT or drive motor, an autobalancer corresponding to FIG. 1 is provided which comprises a device for compensating unbalance which is provided in the hold-down P. The information medium IT centred on the disc turntable PT on its dome is clamped in a known way with the hold-down P between the disc turntable PT and hold-down P.

Reference symbols are used in FIG. 1 in a way corresponding to FIG. 2.

It emerges that the device corresponding to FIG. 1 for compensating unbalance has a lesser overall height, which is permitted by a greater diameter of the circularly running groove H in the hold-down P. In the design corresponding to FIG. 1, there are provided as compensating means A for compensating an unbalance originating from the information medium IT and, as the case may be, from the disc turntable PT and drive motor discs which are aligned relative to one another in a circularly running groove H in a fashion opposing the unbalance. The discs used as compensating means A can be designed homogeneously, for example consisting of one material, or inhomogeneously. However, the invention is not limited to disc-shaped compensating means, since balls of an appropriate diameter are also suitable as compensating means A. According to one design, eight balls with a diameter of 3 mm and a total mass of 0.9 gram are arranged in a hold-down P in a groove H with a width of 3.25 mm in conjunction with an outside diameter of 28 mm for the purpose of compensating an unbalance of up to 1.125 grams times centimetre. The compensation of a CD with an unbalance of up to 1 gram times centimetre is already achieved with such a design in a speed range of 6590 to 7350 revolutions per minute.

In principle there is a correlation between the diameter which the course of the groove H has and the mass which is to be applied by the compensating means A, which decreases with a greater diameter. Since the diameter of the hold-down P is not limited by an inside scanning diameter of the information medium IT, the result is a large scope of configuration for the design of the autobalancer in the hold-down P, and a lesser overall height is achieved in principle. The autobalancer provided in the hold-down P is very largely independent of the disc turntable PT and drive motor and, because of a greater diameter of the circle which is formed by the groove H, a lesser deflection of the autobalancer is required to align the compensating means A for compensating an unbalance.

A device, provided in the hold-down P for compensating unbalance is preferably configured such that it has an overall height corresponding to a hold-down P without means for compensating unbalance, in order to achieve a high degree of flexibility in designing different units, and not to have to undertake any changes to other system components.

Figure 3:
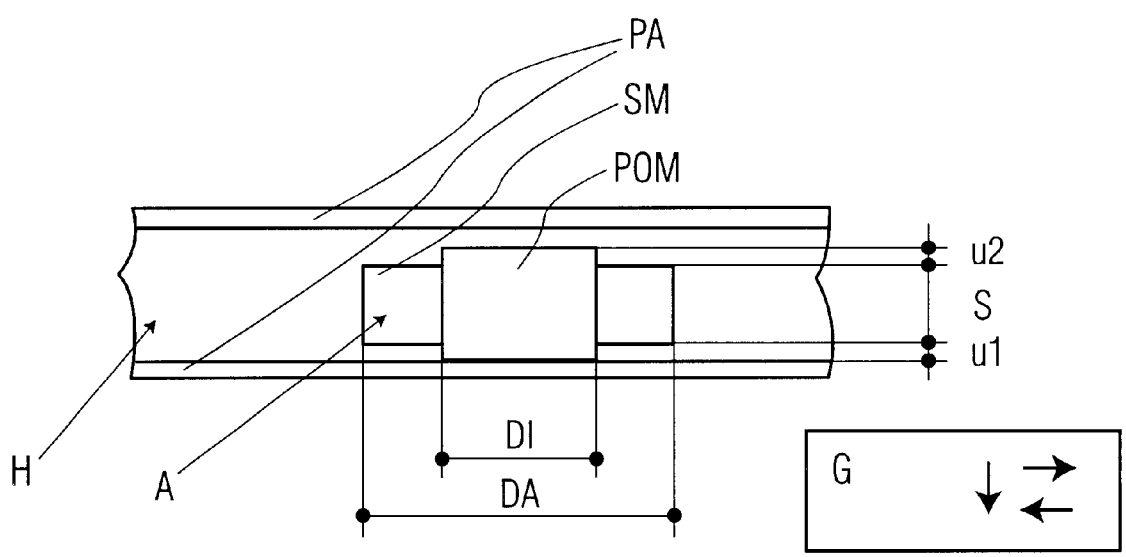
FIG. 3 shows a sketch of the principle of a section through a disc used as means for compensating unbalance in an autobalancer.

FIG. 3 represents a sketch of the principle of a section through a disc used as means for compensating unbalance in an autobalancer. The disc used as compensating means A has a projection Ü1 with a diameter DI which is selected to be in the range from 30 to 50% of the outside diameter DA of the disc. Arrows specified in a box with the designation G, which represent the direction of the gravitation forces, make it plain that with the projection Ü1 the bearing surface or friction surface is reduced when the drive is installed in a horizontal position. The disc is configured in such a way that it consists of two materials, the material in the inner region, which forms the projection Ü1, preferably being a plastic POM having good surface slip such as, for example, acetal homopolymer or acetal copolymer which is also known under the trade names of Derlin, Hostaform or Ultraform. Such materials have a hard, low-friction and wear-resistant surface. The disc used as compensating means A slides on the projection Ü1 in the groove H, whose surface PA is preferably formed from a polyamide which is hard and tough, stiff, wear-resistant, scratch proof and has very good surface slip. For the purpose of applying the appropriate mass, heavy materials such as, for example, steel, lead or brass are suitable as material in the outer region of the disc, which there has a height S in the range from 1.5 to 2.5 millimetres. The projection Ü1 in the inner region of the disc is selected to be in the range from half a tenth to five tenths of a millimetre.

One projection Ü1 is sufficient when the drive is installed in the horizontal position. However, the disc can also be designed in one piece and symmetrically. A second projection Ü2 is provided, in particular, for sliding on both sides when the drive is installed in the vertical position, and also offers the advantage in the case of a horizontal position of installation that there is no need to take account of the alignment of the disc when mounting. The compensating means A in the form of a disc is therefore particularly advantageous, since both a lesser overall height and a lesser running noise are achieved.

What is claimed is:

1. Recording or reproducing unit for a plate-shaped information medium, which is clamped with a hold-down on a disc turntable, and having an improved means for compensating an unbalance, comprising:

a device for unbalance compensation arranged in the hold-down at a diameter greater than an inside scanning diameter, required for scanning, of said information medium and formed by at least one discs in a circularly running grove forming said means for compensating an unbalance.

2. Recording or reproducing unit according to claim 1 wherein said compensating means is at least one ball in the circularly running groove arranged in the hold-down at a diameter greater than an inside scanning diameter, required for scanning, of said information medium.

3. Recording or reproducing unit according to claim 1 wherein said means for compensating an unbalance is a device, provided in the hold-down, for unbalance compensation which is formed by a groove which contains at least one disc provided as compensating means.

4. Recording or reproducing according to claim 1, wherein said means for compensating an unbalance is a device, provided in the hold-down, for unbalance compensating compensation is formed by a groove in which at least one disc provided as compensating means is provided in a sliding fashion.

5. Recording or reproducing unit according to claim 1, wherein said means for compensating an unbalance is a device, provided in the hold-down, for unbalance compensation which is formed by a groove in which there is provided at least one disc which is provided as compensating means and has at least one lateral projection which is formed from a material which is homogeneous relative to the material of the disc, or from a material having good surface slip.

6. Recording or reproducing unit according to claim 1, wherein discs in a circularly running groove are selected to from said means for compensating an unbalance to reduce noise and to avoid run around several times and strike one another.

7. Recording or reproducing unit according to claim 1, wherein said discs in a circularly running groove forming said means for compensating an unbalance have a projection with a lesser diameter.

8. Recording or reproducing unit according to claim 1, wherein said discs for compensating unbalance consists of two materials, the material in the inner region, which forms a projection, being a plastic having good surface slip, and the material in the outer region being a heavy material, such as steel, lead or brass.

9. Recording or reproducing unit according to claim 1, wherein said discs in a circularly running groove forming said means for compensating an unbalance have a projection with a lesser diameter in a ration of inside to outside diameter in the range from 30 to 50%.

10. Recording or reproducing unit according to claim 1, wherein said discs have a lateral projection in the inner region of the disc selected to be in the range from half a tenth to five tenths of a millimeter and approximately two millimeters as the thickness of the disc.

11. Recording or reproducing unit according to claim 1, wherein said discs have a first and a second projection provided for sliding on both sides when the drive is installed in the vertical position.

* * * * *